United States Patent
Chen et al.

(10) Patent No.: US 10,223,324 B2
(45) Date of Patent: Mar. 5, 2019

(54) DIGITAL INTERCONNECTS WITH PROTOCOL-AGNOSTIC REPEATERS

(71) Applicant: INTEL CORPORATION, Santa Clara, CA (US)

(72) Inventors: Huimin Chen, Portland, OR (US); Duane G. Quiet, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/607,362

(22) Filed: May 26, 2017

(65) Prior Publication Data

US 2017/0262401 A1 Sep. 14, 2017

Related U.S. Application Data

(62) Division of application No. 14/672,168, filed on Mar. 28, 2015.

(60) Provisional application No. 62/100,069, filed on Jan. 6, 2015.

(51) Int. Cl.
 *G06F 13/00* (2006.01)
 *G06F 13/38* (2006.01)
 *G06F 13/40* (2006.01)
 *G06F 13/42* (2006.01)

(52) U.S. Cl.
 CPC .................. *G06F 13/4291* (2013.01)

(58) Field of Classification Search
 CPC ........... G06F 13/00; G06F 13/38; G06F 13/40
 See application file for complete search history.

(56) References Cited

U.S. PATENT DOCUMENTS

| | | |
|---|---|---|
| 7,474,612 B1 | 1/2009 | Patel |
| 2005/0220240 A1 | 10/2005 | Lesso |
| 2009/0259878 A1* | 10/2009 | Remlin ............... G06F 13/4045 713/600 |
| 2014/0129867 A1* | 5/2014 | Caruk ...................... G06F 1/00 713/500 |

(Continued)

OTHER PUBLICATIONS

Non-Final Office Action dated Jun. 14, 2017 for U.S. Appl. No. 14/672,168, 17 pages.

(Continued)

*Primary Examiner* — David E Martinez
(74) *Attorney, Agent, or Firm* — Schwabe, Williamson & Wyatt, P.C.

(57) ABSTRACT

A system and method is described for simplifying implementation of repeater (e.g., re-driver/re-timer) module implementation in high-data-rate interconnects that carry a relatively low-data-rate clock signal as well as the data stream (e.g., PCIe). At the endpoint, any information critical to the function of the repeater (e.g., the most recent data rate negotiated by a pair of endpoints communicating through the repeater) is embedded in the clock signal by pulse-width modulation as ordered sets. The repeater only needs to read the clock-embedded information rather than decoding the data stream. Thus repeaters for such applications reconstruct the high-rate data-stream while actually decoding only the low-rate clock signal. Because the clock-signal protocol is independent of the data-stream protocol, the repeater's operation is protocol-agnostic with respect to the data-stream.

8 Claims, 16 Drawing Sheets

(56) References Cited

U.S. PATENT DOCUMENTS

2016/0377679 A1* 12/2016 Froelich .................. H04B 3/46
                                                              714/735
2017/0315946 A1    11/2017 Maung et al.

OTHER PUBLICATIONS

Non-Final Office Action dated Nov. 30, 2017 for U.S. Appl. No. 14/672,168, 9 pages.
Non-Final Office Action dated Jun. 15, 2018 for U.S. Appl. No. 15/607,371, 15 pages.

* cited by examiner

| Word header | Word type | Word field | Word sub-field | Parity |
|---|---|---|---|---|
| b1~b0 | b2 | b5~b3 | b14~b6 | b15 |
| 11 (constant) | 1: word (training) | 000: internal link TxEQ/RxEQ settings at 2.5GT/s<br>001: internal link TxEQ/RxEQ settings at 5GT/s<br>010: internal link TxEQ/RxEQ settings at 8GT/s<br>011: reserved<br>100: external link TxEQ/RxEQ settings at 2.5GT/s<br>101: external link TxEQ/RxEQ settings at 5GT/s<br>110: external link TxEQ/RxEQ settings at 8GT/s<br>111: reserved | b9~b6: TxEQ (PCIe3 table 4-3)<br>b12~b10: RxEQ (table 4-4)<br>b14~b13: reserved<br><br>906 | odd parity<br><br>908 |
| | 0: half-word (control)<br><br>904 | b6~b3: link control<br>0000: 2.5GT/s<br>0001: 5GT/s<br>0010: 8GT/s<br>0011~0111: reserved<br>1000: L0<br>1001: L0s<br>1010: L1_off<br>1011: L1_snooze<br>1100: L2<br>1101: Loopback<br>1110~1111: reserved<br><br>916 | | b7:<br>odd parity |

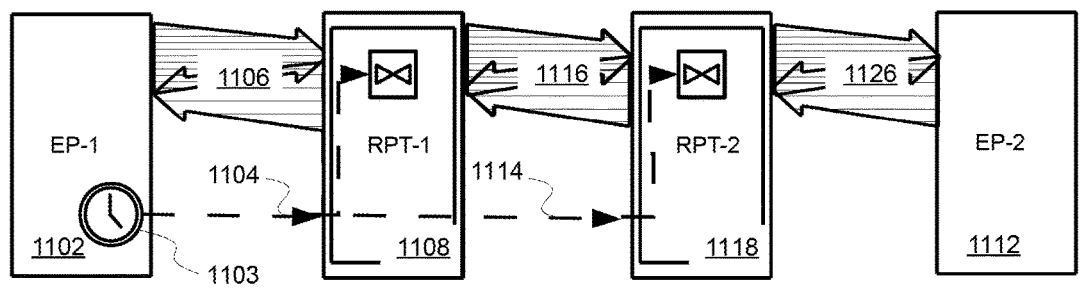
FIG. 11A
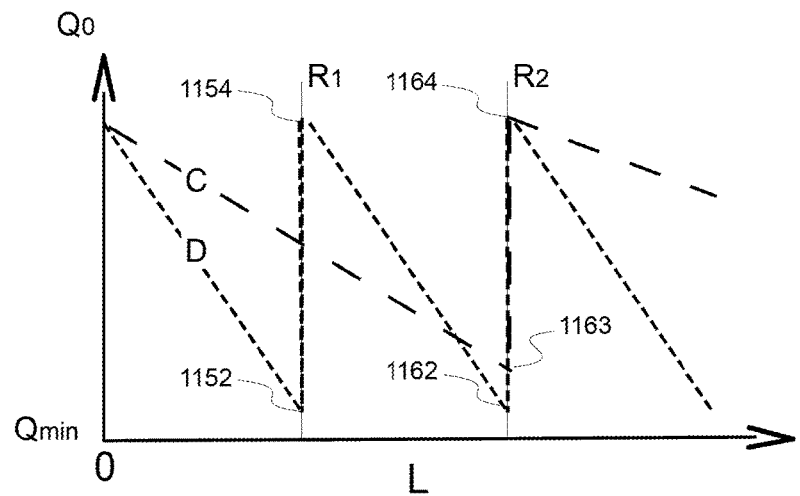
FIG. 11B
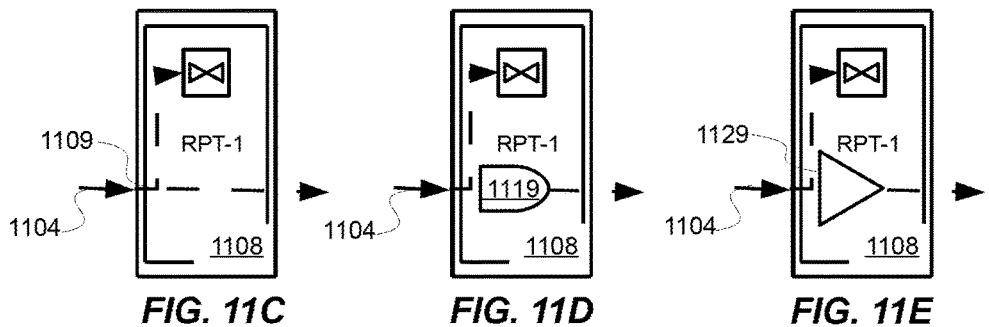
FIG. 11C   FIG. 11D   FIG. 11E

DIGITAL INTERCONNECTS WITH PROTOCOL-AGNOSTIC REPEATERS

RELATED APPLICATIONS

This application claims the benefit of priority from U.S. Prov. Pat. App. 62/100,069 filed 6 Jan. 2015, which is entirely incorporated by reference herein and U.S. Non-Prov. patent application Ser. No. 14/672,168 filed 28 Mar. 2015 which is entirely incorporated by reference herein.

FEDERALLY SPONSORED RESEARCH AND DEVELOPMENT

None

APPENDICES

None

FIELD

Embodiments described herein generally relate to computing, digital communication, and more particularly boosting and reconstructing signals degraded by channel effects.

BACKGROUND

In communication links, often an increase in data rate aggravates the distance-dependent signal degradation in the link thereby shortening the distance that a signal can travel through the link while remaining readable. To compensate for the increased signal degradation, higher-powered transmitters and/or repeaters may be used for higher data rates, or additional repeaters may be added between existing repeaters along the link. These solutions may increase cost, complexity, power consumption, or waste heat generation.

The cost of repeaters increases by a significant fraction if they need to be configured for the particular mode of operation of each link, especially if the mode may change (e.g., one message is transmitted at a low data rate, but a subsequent message is transmitted at a higher data rate). Operating parameters that may vary between different modes of operation may include data rate, link power states, and test mode.

A re-driving repeater may receive operating parameters or configuration instructions from a sideband signal. A re-timing repeater may receive information about the mode of operation by participating in link training and detecting and decoding the communications between the two endpoints. Either approach requires significant effort. Components needing to handle high data rates reliably may be subject to more and tighter constraints than those for use at lower rates; stricter or extra constraints tend to raise production costs. In addition, the repeaters may need to track and extract their required operating parameters, e.g., a Training Sequence 1 (TS1) ordered set, from among numerous other fast-moving messages on the link. Each communication protocol may have its own identifiers tagging the ordered set. Therefore, (1) the repeater must understand the particular protocol being used by the endpoints in order to find and extract the recovery parameters, and (2) a change in protocol on a network may involve replacing (or at least reconfiguring) all the affected repeaters. Both of these constraints also add cost.

The cost, energy efficiency, and reliability of PCIe and similar networks could therefore benefit from a way to make the repeaters simpler or to make them more versatile to use for different protocols. The present disclosure addresses such needs.

BRIEF DESCRIPTION OF DRAWINGS

The following drawings are provided to aid the reader in understanding the disclosure. They are intended as examples that do not limit the scope of the claimed invention. They may be conceptual or schematic diagrams and are not necessarily to scale.

FIG. 9 is a table of examples of ordered sets used to train and control a PCIe link.

FIGS. 11A-E are block diagrams of examples of multi-repeater links.

DETAILED DESCRIPTION

Figure 1:
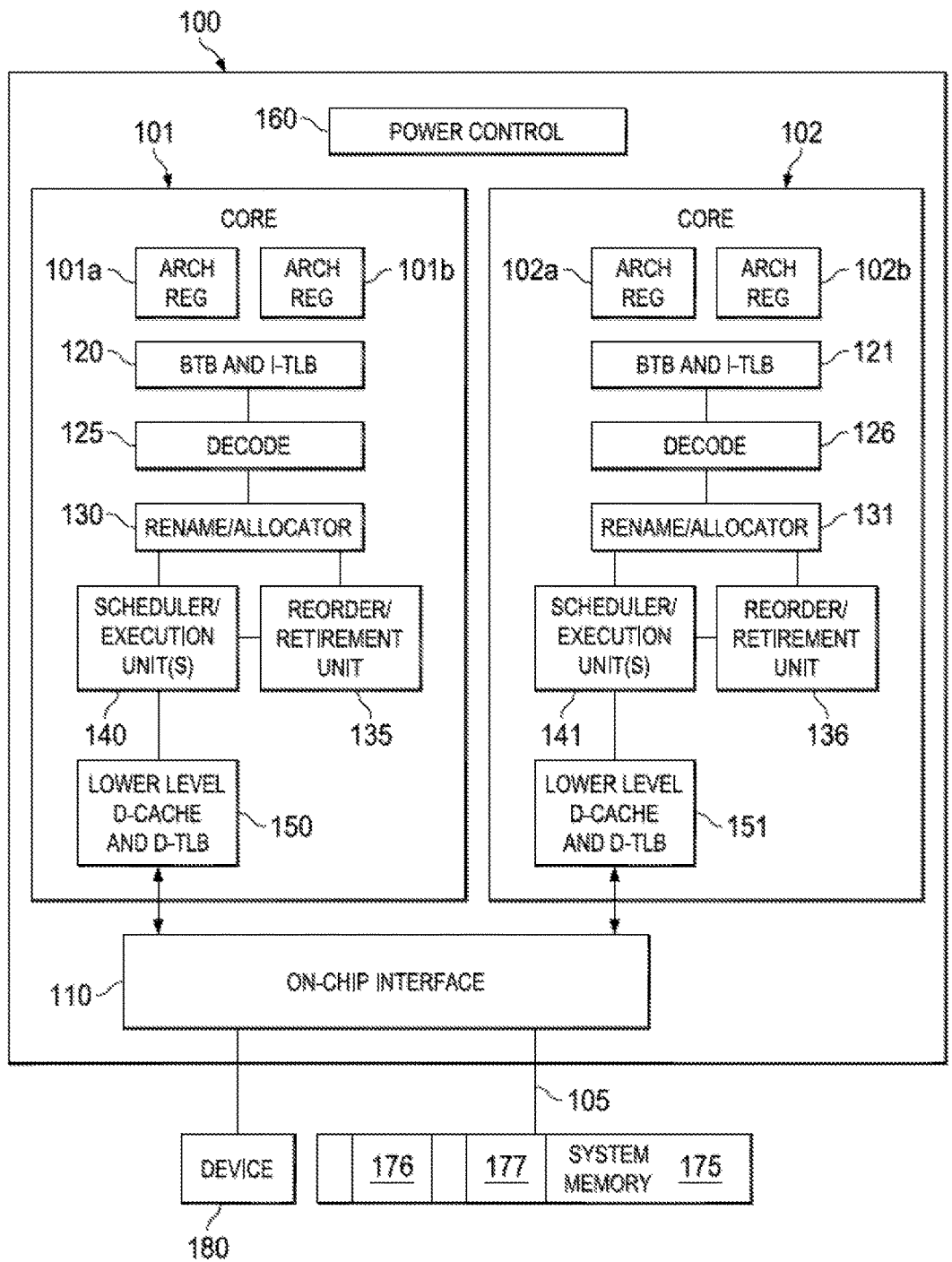
FIG. 1 is a block diagram of an example of a computing system with a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™; they may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

FIG. 1 is a block diagram of an example of a computing system with a multicore processor. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement units 135, 136, ILTB 120, load/store buffers, and queues may be shared through partitioning. Other resources, such as general purpose internal registers, page-table base register(s), low-level data-cache and data-TLB 115, execution unit(s) 140, 141, and portions of out-of-order unit 135, 136 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer blocks 130, 131 include an allocator to reserve resources, such as register files to store instruction processing results. However, threads 101a and 101b are potentially capable of out-of-order execution, where allocator and renamer blocks 130, 131 also reserve other resources, such as reorder buffers to track instruction results. Units 130, 131 may also include a register renamer to rename program/instruction reference registers to other registers internal to processor 100. Reorder/retirement units 135, 136 include components, such as the reorder buffers mentioned above, load buffers, and store buffers, to support out-of-order execution and later in-order retirement of instructions executed out-of-order.

Scheduler and execution unit(s) blocks 140, 141, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffers (D-TLB) 150, 151z are coupled to execution unit(s) 140, 141. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof. One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
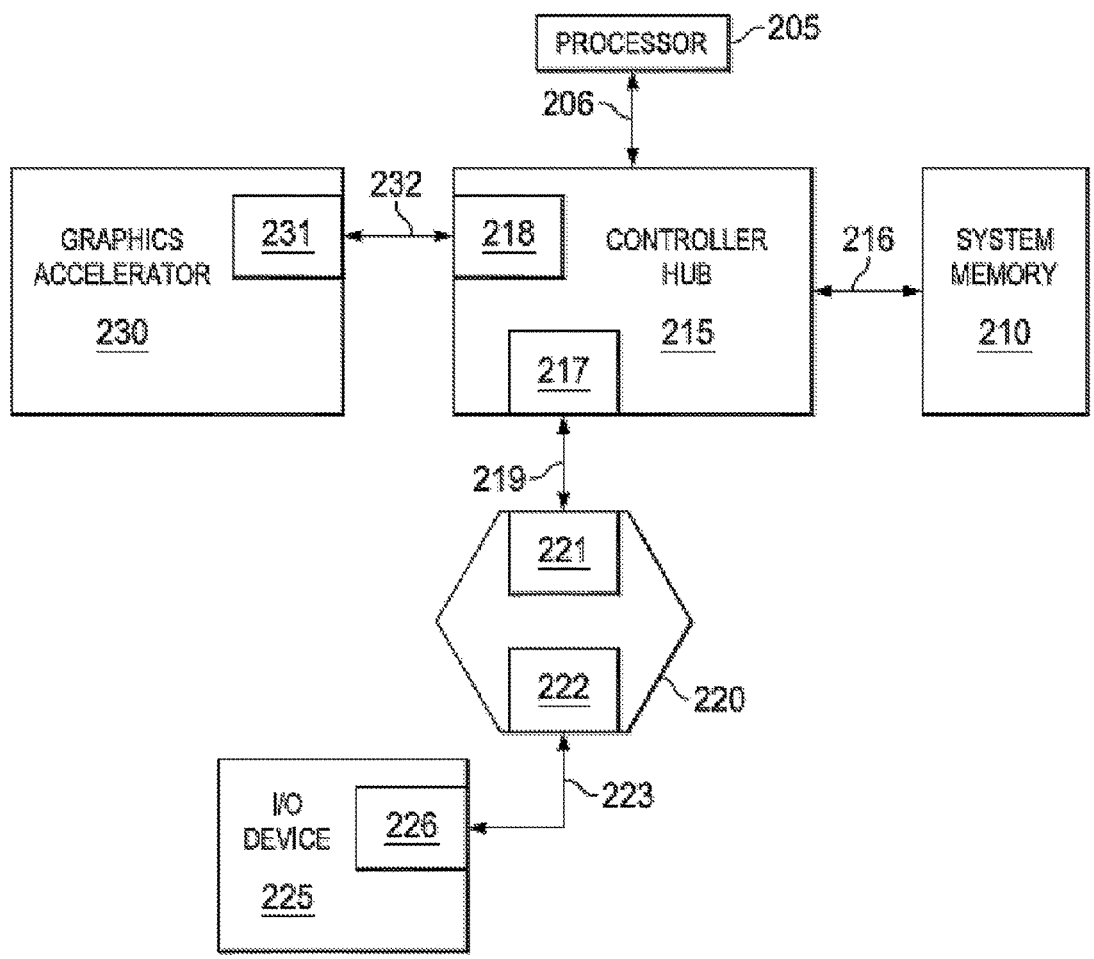
FIG. 2 is a block diagram of an example of computing architecture supporting a Peripheral Component Interconnect Express (PCIe) connection to a peripheral input/output (I/O) device.

FIG. 2 is a block diagram of an example of computing architecture supporting a Peripheral Component Interconnect Express (PCIe) connection to a peripheral input/output (I/O) device. An embodiment of a fabric composed of point-to-point links interconnecting multiple components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In one embodiment, peer-to-peer routing is optionally supported through the root complex device.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225 (i.e. interface ports 22, 226 through serial link 223). Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
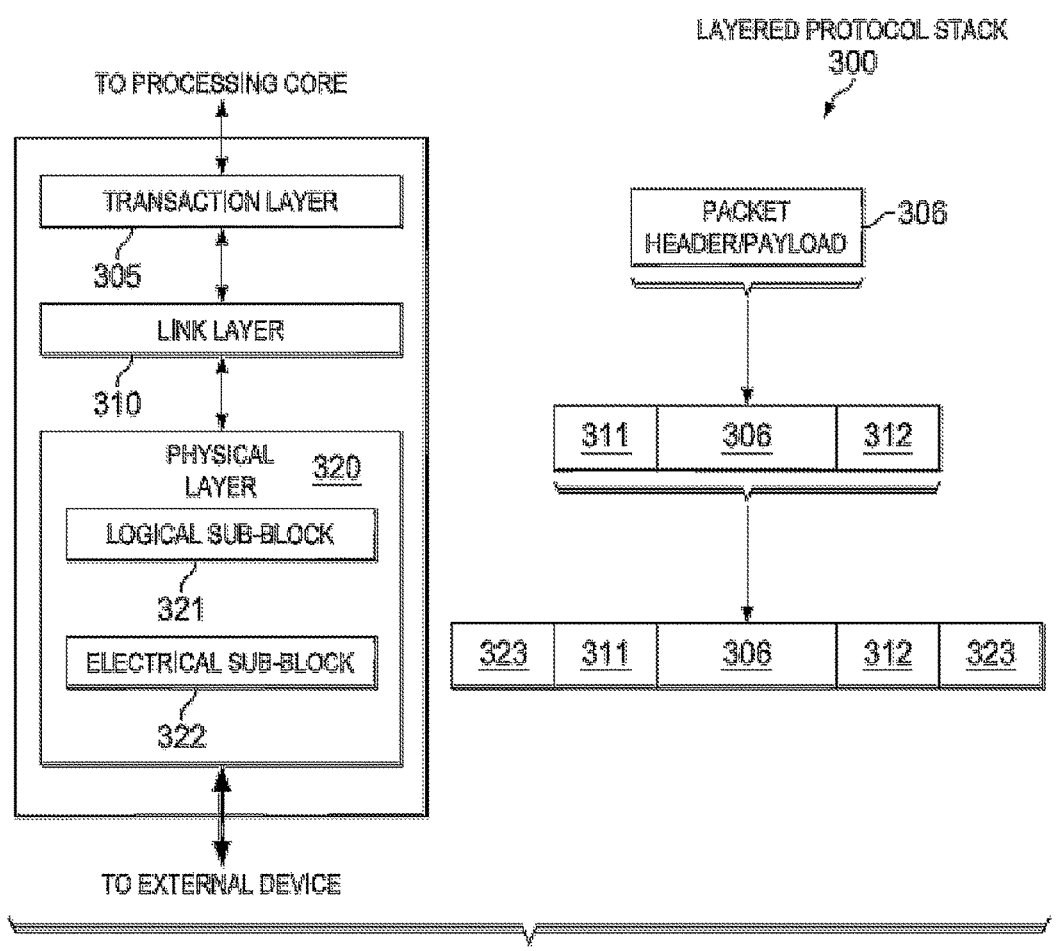
FIG. 3 is a block diagram of an example of communication layers and a layered stack for a PCIe interconnect.

FIG. 3 is a block diagram of an example of communication layers and a layered stack for a PCIe interconnect. Layered protocol stack 300 may be any form of layered communication stack, such as a Quick Path Interconnect (QPI) stack, a PCIe stack, a next generation high performance computing interconnect stack, or other layered stack. Although the discussions of FIGS. 2-5 relate to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that may be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The transaction layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 115 in FIG. 1, which counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Link Layer

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

As the frequency of serial links increase and chips migrate to new process technologies with ever decreasing device sizes, it becomes increasingly important to provide the capability to dynamically adjust the transmitter and receiver equalization settings to account for platform and silicon variations.

PCIe Generation 3 (PCIe Gen3) is an example of an industry standard that has equalization on a per transmitter-receiver pair basis to ensure interoperability at 8 GT/s for the wide range of systems that deploy PCIe. However, the wide variety of devices, manufactured by different vendors, with different process technologies, each with their proprietary transmitter/receiver design, and proprietary hardware algorithms to adapt makes it a challenge to design components with guaranteed interoperability.

Figure 4:
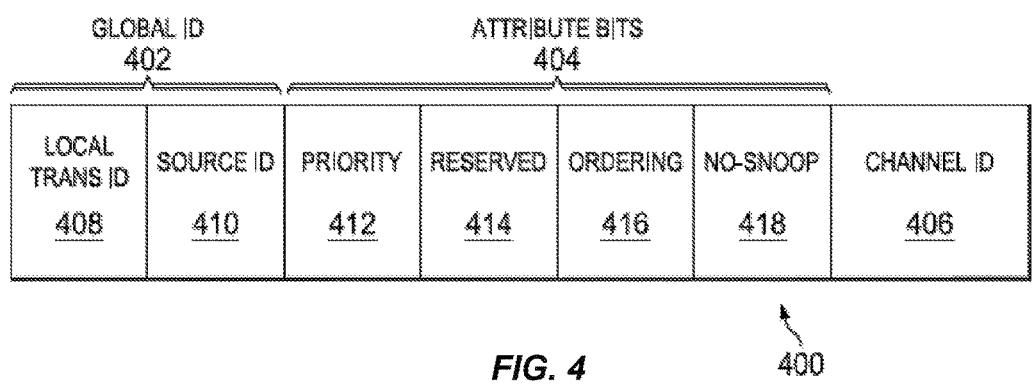
FIG. 4 illustrates an example of PCIe data packet structure.

FIG. 4 illustrates an example of PCIe data packet structure. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes may pass writes in the same direction, and read completions may pass writes in the same direction. Snoop attribute field 418 is utilized to determine if transactions are snooped. As shown, channel ID Field 406 identifies a channel associated with a transaction.

Figure 5:
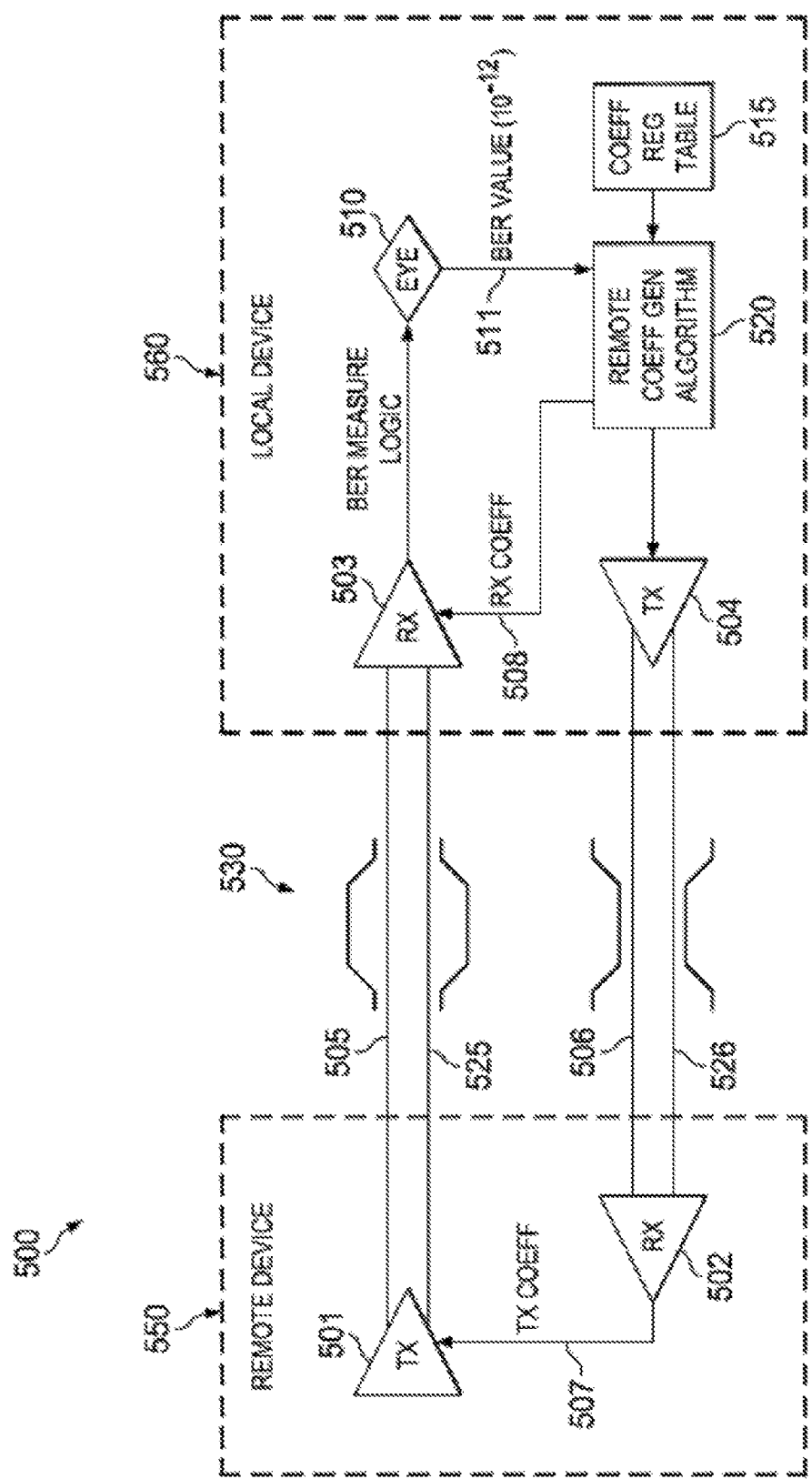
FIG. 5 is a schematic diagram of an example of a point-to-point interconnect during training.

FIG. 5 is a schematic diagram of an example of a point-to-point interconnect during training. Although an embodiment of a PCIe serial point-to-point link is illustrated, the disclosed approaches may be used with other types of transmission paths for serial data without exceeding the scope of the subject matter. In the embodiment shown, a basic PCIe link 530 includes two low-voltage, differentially driven signal pairs: a transmit pair 505/525 and a receive pair 506/526. Accordingly, device 550 includes transmission logic 501 to transmit data to device 560 over two transmitting paths 505 and 525, and also includes receiving logic 502 to receive data from device 560 over two receiving paths 506 and 526.

A transmission path refers to any path for transmitting data, such as a transmission line, a copper line, an optical line, a wireless communication channel, an infrared communication link, or other communication path. A connection between two devices, such as device 550 and device 560, is referred to as a link, such as link 530. Each lane represents a set of differential signal pairs (one pair for transmission, one pair for reception). A link may support one lane, or may scale bandwidth by aggregating multiple lanes. Link width is denoted by xN, where N is any supported number of lanes such as 1, 2, 4, 8, 12, 16, 32, 64, or more.

A differential pair refers to a pair of paths over which differential signals are transmitted and received. As an example, when line 505 toggles from a low voltage level to a high voltage level, i.e., a rising edge, line 525 drives from a high logic level to a low logic level, i.e., a falling edge. Differential signals potentially demonstrate better electrical characteristics, such as better signal integrity, i.e., cross-coupling, voltage overshoot/undershoot, ringing, etcetera. This allows for better timing window, which enables faster transmission frequencies.

As the electronics industry is moving towards greater integration such that more and more system components are integrated into SoCs, focus has shifted to define various technologies and network topologies to interconnect the SoCs for scalable multi-node, multi-cluster, multi-node (collectively referred to as "multi-node" hereafter) system architecture that provides low power and cost targets in addition to providing high-level reliability, availability, and serviceability (RAS). Furthermore, as electronic systems move from single-node to multi-node topologies, it is not cost effective to provide a single node dedicated resource for each node and therefore the ability to share I/O resources within multi-node topologies is needed.

Repeaters

The term "repeater" is used herein as a generic for any component that boosts or reconstructs an incoming signal and transmits the improved (i.e., boosted or reconstructed) signal. Many types of communication links are subject to signal degradations that worsen with length, such as attenuation or inter-symbol interference. Repeaters enable the signals on such lines to travel over greater distances and still be readable at the destination. Repeaters may be re-drivers, which transform an incoming analog signal using linear amplifiers with equalizers to boost the signal amplitude and cancel out channel-induced inter-symbol interference while preserving the signal's linearity. Repeaters also may be re-timers, which recover an incoming analog signal using data recovery circuitry and re-transmit the recovered signal with most or all of the channel-induced signal degradation removed.

Figure 6A:
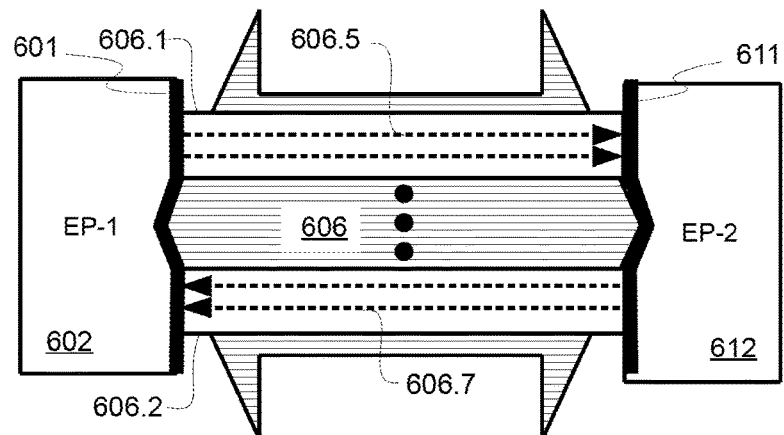
FIGS. 6A-C are block diagrams of examples of PCIe interconnects.
Figure 6B:
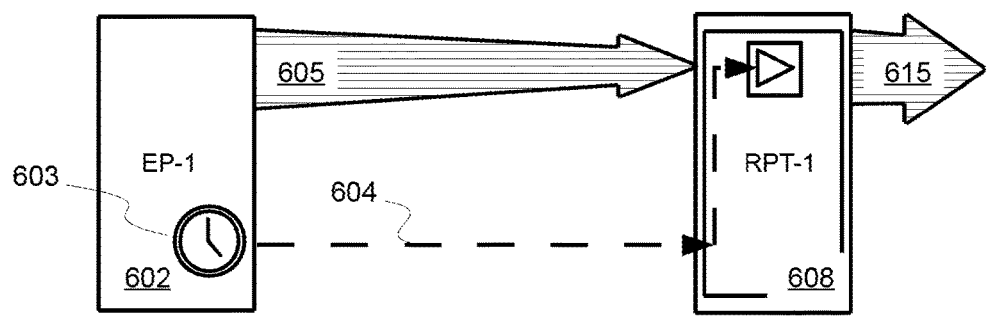
Figure 6C:
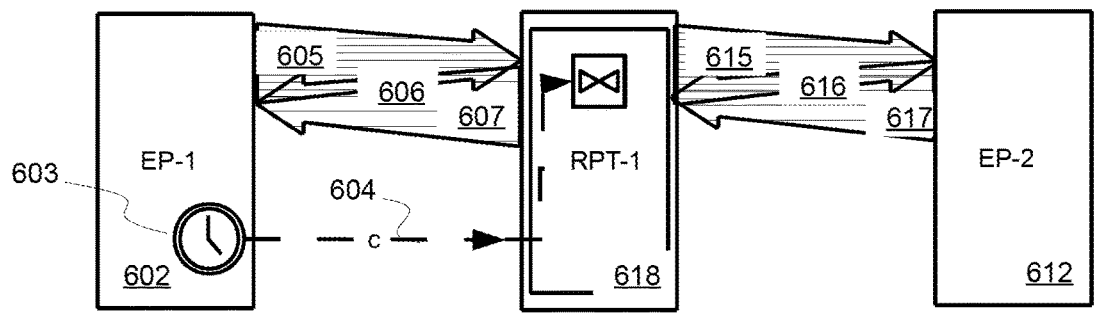

FIGS. 6A-C are block diagrams of examples of PCIe interconnects. FIG. 6A conceptually illustrates an example of a PCIe-type link. A first endpoint 602 is equipped with a PCIe port 601. A second endpoint 612 is equipped with a PCIe port 611. Through these ports (e.g., an upstream port on a peripheral endpoint and a downstream port on a controller endpoint) communication occurs over a link 606. Link 606 operates on a dual-simplex topology. Each simplex channel 606.1, 606.2 includes a number of lanes 606.5, 606.7. The three dots in the center of link 606 represent other lanes that could be present in simplex channels 606.1 and 606.2 in various embodiments. In some embodiments, the total number of lanes is a power of 2 such as 2 (for PCIe generation 1), 4 (for PCIe2), 8 (for PCIe3), 16 (for PCIe4), or 32 (for PCIe5).

Some PCIe links can be reconfigured to change data rates: carrying one message at a first data rate, then reconfiguring before carrying a subsequent message at a second data rate. This is helpful for prioritizing different types of traffic on the link and for conserving operating power. However, before sending traffic at a given rate, the transmitting node must confirm that the receiving node is ready to receive traffic at that given rate.

Typically, short messages for speed negotiation and/or training (e.g., ordered sets) are exchanged between the nodes before transmitting the main message. The speed negotiation process ends when the transmitter sends a preliminary message containing a certain data rate and the receiver replies with a preliminary message containing the same data rate. Subsequent exchanged messages do not contain data rates because a rate is now selected. The transmitter and receiver automatically configure themselves to accommodate the selected rate.

FIG. 6B conceptually illustrates an endpoint sending data and clock signal to a one-way repeater. (Although many of the examples in this description are related to bi-directional parameter training and negotiation sequences such as those of PCIe, unidirectional systems may benefit from enabling repeaters or other intermediate in-line components to change their operating parameters). Endpoint 602 transmits data 605, which loses amplitude, quality, or both as a function of travel distance (represented by the narrowing of the arrow from left to right). For example, data 605 may be transmitted at a high rate (e.g., greater than 1 Gbps). To extend the distance that the signal from endpoint 602 can travel while remaining readable, a first repeater 608 intercepts data signal 605 at a point where it is still recoverable.

Repeater 608 may be a re-driver, a re-timer, or a combination of both. For example, in some types of combination repeater, a re-driver transforms the attenuated input signal to restore its original transmitted signal quality. A re-timer recovers the incoming signal with its data recovery circuit and re-transmits the recovered data with its locally generated transmit clock. Output data signal 615 coming out of the repeater thus has increased amplitude, corrected timing, or both compared to input signal 605 in the condition in which it entered repeater 608.

Repeaters and other intermediate, in-line signal conditioners in a variable-rate network may configure themselves differently for different data rates, just as do the link endpoints such as endpoint 602 and, in FIG. 6A, endpoint 612. Because the preliminary messages between the endpoints necessarily pass through all the other components of the link, the signal conditioners may be configured to sample, or "sniff," the preliminary messages, perhaps routing the samples to a first-in, first-out (FIFO) buffer so that when the same data-rate identifier is detected in messages traveling in opposite directions, the signal conditioner configures itself for that rate.

Although these sample-and-recognize approaches seem somewhat straightforward, complications arise as the maximum data-rate (or, in some cases, the range of data rates) increase. First, these approaches force all the signal conditioners or other intermediate in-line components to approach the sophistication of the endpoints if they are to reliably detect data rates and other necessary operating parameters flying by at higher and higher speeds. Second, the recognition algorithms (by which the intermediate in-line components extract the data that concerns them from a stream of other data that does not) are protocol-dependent. For example, a repeater for a PCIe system may have a different algorithm for tracking and decoding the preliminary messages compared to a repeater for a Display-Port (DP) system, and a repeater for a Universal Serial Bus (USB) system may be different from both. Both of these ramifications of higher data-rate add cost and complexity to any intermediate in-line component that needs to reconfigure itself for different data rates or for any negotiated or randomly changing variable, if those components need to extract commands relevant to them from a fast-moving stream of other information such as signal 605.

However, endpoint 602 includes a clock signal source 603. This may be an on-board clock, for example if endpoints 602 is a master controller. Alternatively, a clock signal may be routed through endpoint 602 from elsewhere in the network. The rate of clock signal 604 may be much lower than the rate of data signal 605. For example, the clock signal rate may be 100 MHz, more than an order of magnitude slower than even a PCIe1 data signal. Components capable of reliably transmitting. receiving, encoding, decoding, and otherwise conditioning a 100 MHz signal are generally simpler and less expensive than similar components for GHz data rates. Moreover, clock rates may be approximately the same between systems using different protocols for their data streams.

It is possible, using modulation techniques, to embed additional data in a clock signal without losing the timing information. The timing information may be preserved in any detectable periodic feature of the original clock waveform (e.g., a square wave) that the modulation does not inconsistently perturb (e.g., shift in one direction for a first clock pulse, but in the opposite direction for the next clock pulse). So, for example, endpoint 602 might modulate clock signal 604 to embed additional information such as the selected data-rate or any other operating parameter required of an intermediate in-line component such as repeater 608. Repeater 608, configured to decode the embedded information, would then receive its operating parameters such as data rate from the relatively slow clock signal 604.

Endpoint 602, already configured for the specific protocol of the link, readily recognizes and extracts operating parameters relevant to repeater 608 and other intermediate in-line components. Endpoint 602 then feeds the extracted operating parameters to its internal clock-signal modulator, perhaps prepending a simple identifying header to the modulated clock signal if more than one parameter needs to be communicated to intermediate in-line components. In some embodiments, identifying headers and other formatting of the modulated clock signal may be made consistent across multiple data-stream protocols. Therefore, repeaters and other intermediate in-line components would only need to decode the consistent clock-signal formatting, without being programmed to recognize the data-stream protocol; that is, the intermediate in-line components would be protocol-agnostic.

FIG. 6C conceptually illustrates two-way communication between a first endpoint 602 and a second endpoint 612 through a two-way repeater 618. The link between endpoint 602 and endpoint 612 now has two segments: segment 606 between endpoint 602 and repeater 618, and segment 616 between repeater 618 and endpoint 612. Repeater 618 receives data signal 605 after some deterioration with travel distance, boosts and/or reconstructs signal 605, and transmits a recovered version 615. Repeater 618 also receives data signal 617 after some deterioration with travel distance, boosts and/or reconstructs signal 617, and transmits a recovered version 607. Meanwhile, endpoint 602 captures the negotiated data-rate for the main message from the exchange of preliminary messages between itself and endpoint 612 and embeds the data-rate information in clock signal 604. Two-way repeater 608 decodes clock-signal 604 and uses the embedded information to configure itself to boost and/or reconstruct signals 605 and 617 at the selected data-rate.

In some embodiments, it is possible to simultaneously feed an additional encoded clock-signal from endpoint 612 to convey relevant information extracted from signal 617. However, a simpler solution is also possible when the data to be embedded results from a negotiation between the two endpoints, as is the case with selected data rates in variable-rate PCIe systems. When the negotiation is concluded, the data-rate transmitted in one direction on segments 605 and 615 is the same as the data-rate transmitted in the other direction on segment 617 and 607. Therefore, sampling the preliminary messages traveling in either of the two directions will yield the selected data-rate. In some implementations, the endpoint with the clock (602 in this illustration) needs to compare each preliminary message with its immediate predecessor, detect the last message about data rates, and embed the data-rate in that message in the clock signal.

Figure 7:
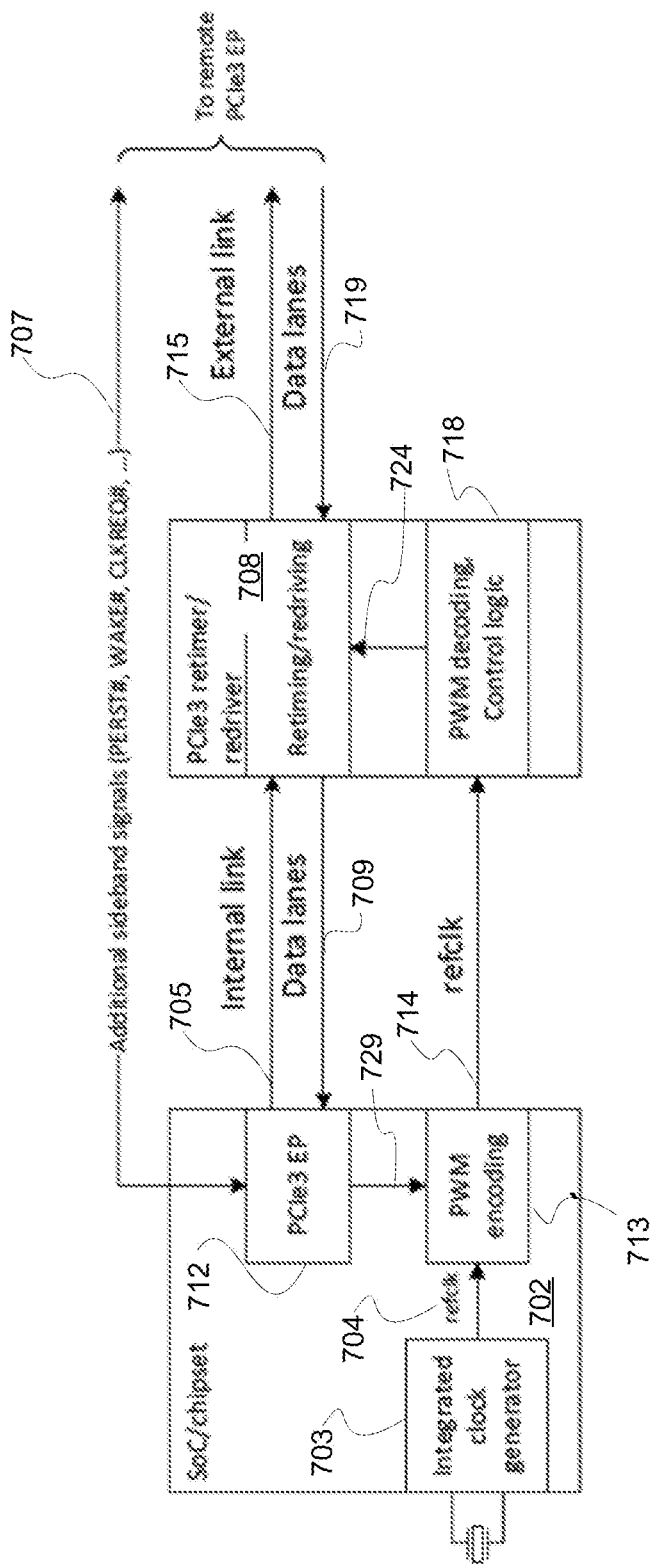
FIG. 7 is a block diagram of an example of data and clock signals entering a repeater.

FIG. 7 is a block diagram of an example of data and clock signals entering a repeater. In this example, the first endpoint 712 is part of a first system-on-chip (SoC) or chipset 702. Clock 703 and pulse-width modulated (PWM) encoder 713, as illustrated, are also part of the SoC or chipset 702, but not inside endpoint 712. However, embodiments with a clock and/or encoder integrated with the endpoint are also contemplated herein. Repeater 708, illustrated in this example as a re-timer/re-driver, may in some embodiments be located on the same board, or elsewhere in the same device, as SoC/chipset 702 so that data lanes 705 and 709 constitute an internal link.

Repeater 708 reconstructs and boosts input data signal 705 to produce output data signal 715, which is being sent to a remote endpoint (not shown). Meanwhile, the remote endpoint sends data signal 719 to repeater 708, which reconstructs and boosts data signal 719 to produce data signal 709. Endpoint 712 and the remote endpoint negotiate a data-rate or other parameter through link segments 705, 715. When the parameter is selected, endpoint 712 copies the parameter value and sends the copy through trace 729 to encoder 713. Encoder 713 encodes raw clock signal 704 to produce a modulated clock signal 714 that retains the original timing information as well as the data-rate information embedded in the modulation.

At the repeater, modulated clock signal 714 is injected into decoding/control module 718. The decoding extracts the embedded data-rate information. The control logic generates a command 724 for the re-timer/re-driver to configure itself for that data-rate which was embedded in the clock signal. In some embodiments, a separate path 707 carries additional side-band signals to and from the remote endpoint. In some embodiments, the remote endpoint is on the motherboard or in another device such as an input/output (I/O) peripheral. In some embodiments, modulated clock signal 714 is used to train the internal link between endpoint 712 and repeater 708.

Figure 8A:
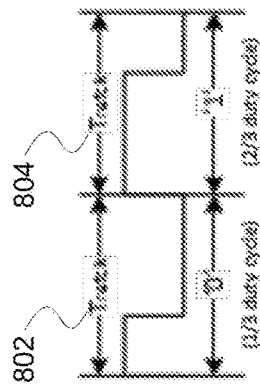
FIGS. 8A-C are pulse diagrams illustrating an example of embedding additional information in a clock signal by pulse-width modulation (PWM).
Figure 8B:
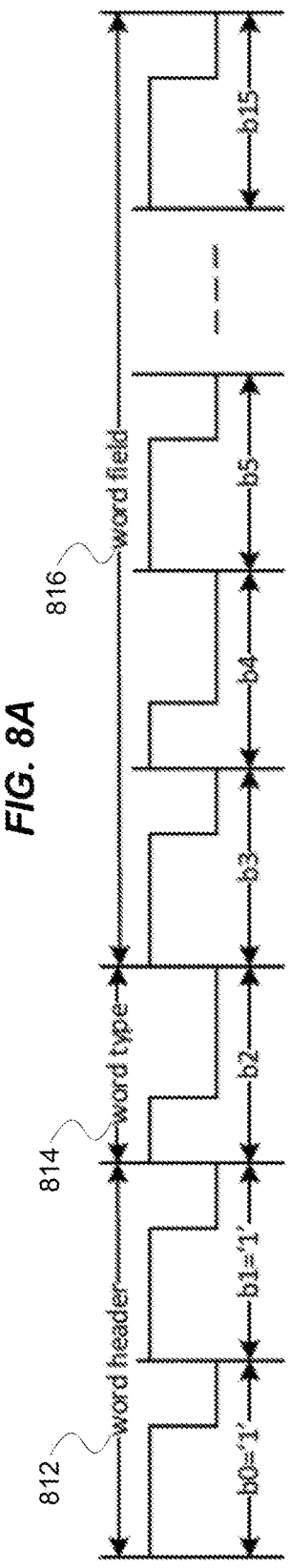
Figure 8C:
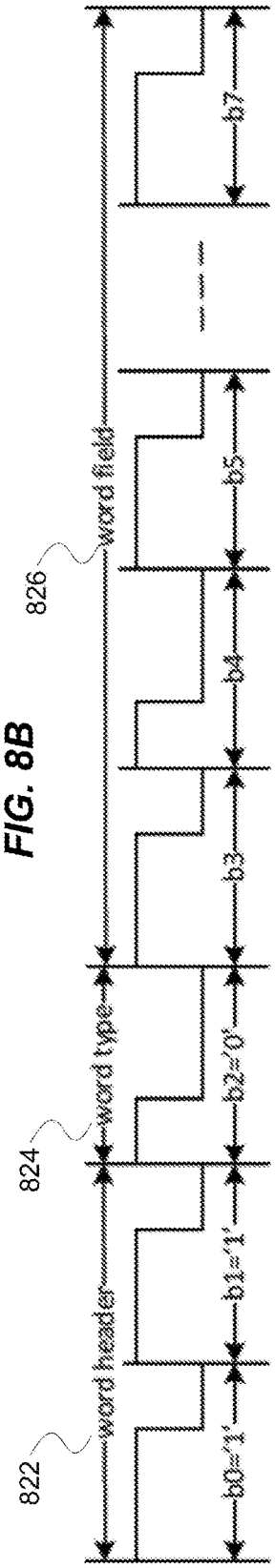

FIGS. 8A-C are pulse diagrams illustrating an example of embedding additional information in a clock signal by pulse-width modulation (PWM). FIG. 8A demonstrates one of the possible embodiments of encoding additional data in a clock signal. Pulse 802 and pulse 804 are each one clock-period long. The rising edges of the pulses are one clock-period apart, thus preserving the timing content of the clock signal. Beyond the rising edge, the pulse duration or duty cycle carries the embedded information. In this binary-encoded example, a logic "zero" may be represented by a pulse with a one-third duty cycle and a logic "one" may be represented by a pulse with a two-thirds duty cycle. The illustrated clock signal is single-handed, but alternatively the clock signal may be differential.

FIG. 8B illustrates an example of a word format for a clock signal modulated with embedded information. The word header 812 is "11" in the illustration, but the header is arbitrary and other headers may be substituted in various embodiments. A single bit 814, immediately following word header 812, identifies the word type; for example, the type-bit may be set to 1 for a full word and zero for a half-word. Twelve subsequent bits constitute word field 816. In some embodiments, the first bit of the word field is the word's least-significant bit.

FIG. 8C illustrates an example of a half-word format for a clock signal modulator with embedded information. In this example, it is roughly identical to the word format, except that only seven bits are allocated to the word field.

FIG. 9 is a table of examples of ordered sets used to train and control a PCIe link. Column 902 holds the initial two bit header, which for this example is "11" for all words and all half-words. Column 904 is the single type-bit; "1" for full-length words and "0" for half-words. Note that in this example, all full words are dedicated to link training and all half-words are dedicated to link control. The full words in region 906 include transmitter equalization and receiver equalization settings optimized for PCIe1 (2.5 GT/s), PCIe2 (5 GT/s), and PCIe3 (8 GT/s).

In this example, the link training is performed in two parts. A first group of full words configures the internal link between an endpoint and a re-timer-type repeater. For example, the endpoint may transmit a training word to configure the transmitter and receiver equalization to a preset value. A second group of full words configures the external link from the re-timer to a remote endpoint. In the two training steps, the re-timer may function as a proxy for a local endpoint, configuring its transmitter or receiver for one of several operating speeds directed by the actual local endpoint, in response to the ordered set embedded in the clock signal.

The half-words also include data-rate settings as well as link commands such as "off," "snooze," and "loopback." The final bit (e.g., bit 15 for words and bit 7 for half-words in this example) specifies the parity. It should be noted that groups of words and their correspondences are not limited to this example. Alternative tables with different examples for training and control words may be implemented herein.

Figure 10:
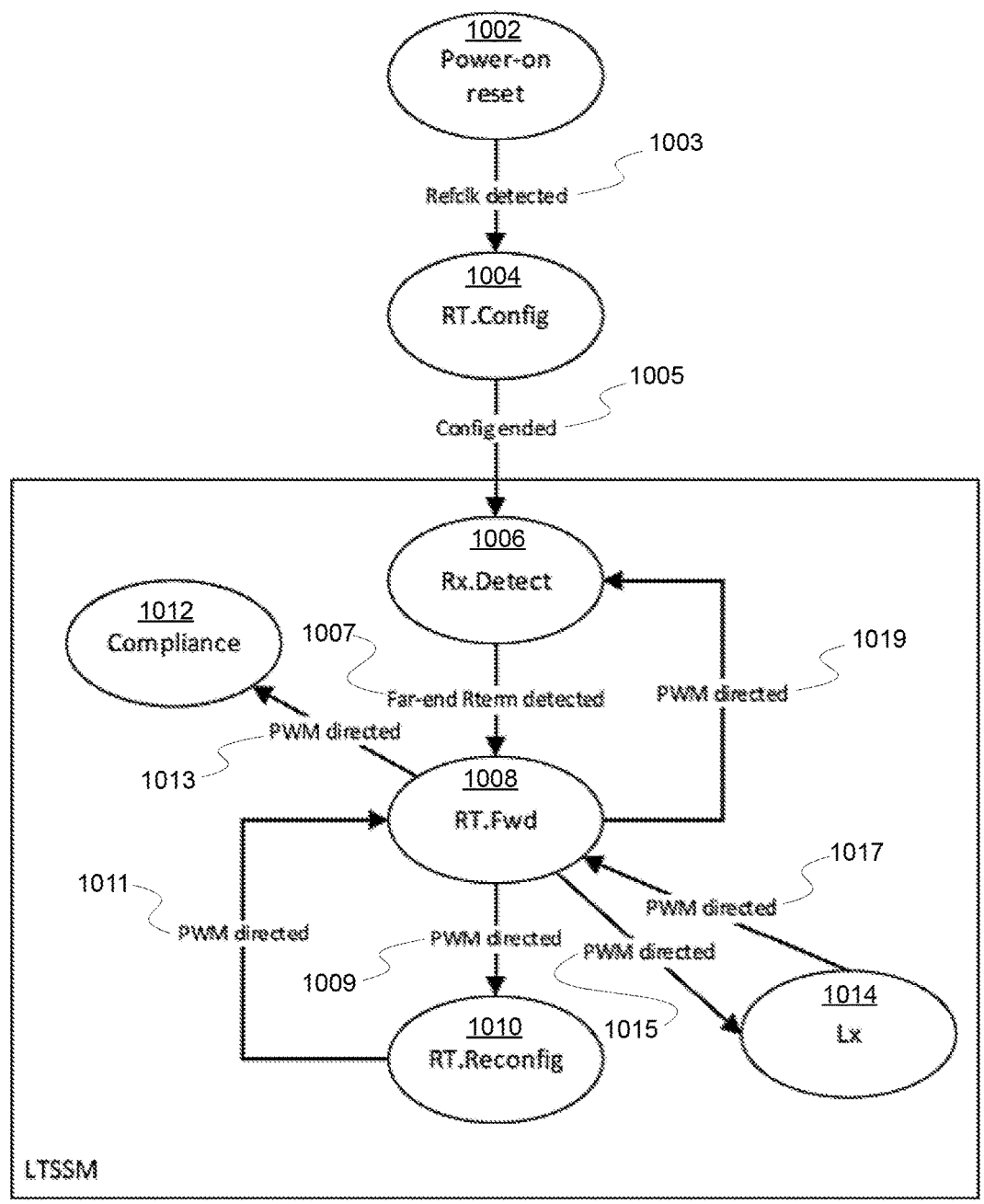
FIG. 10 is an example of a state diagram for a repeater that receives some of its control parameters from a modulated clock signal.

FIG. 10 is an example of a state diagram for a repeater that receives some of its control parameters from a modulated clock signal. The repeater begins in state 1002, power-on reset. This is the initial power-on state, in which the repeater's receiver is enabled in preparation for reading a clock signal and decoding its embedded information. Trigger

1003, detection of a clock signal by the repeater, changes the repeater state to state 1004, receiver and transmitter configuration. In this state, the repeater's modulation (e.g., PWM) decoder is enabled to accept configuration commands from a local endpoint for both the internal link and external link. Trigger 1005, the end of the configuration sequence, moves the repeater into state 1006, Rx.Detect, in which the repeater receives and forwards configuration commands and looks for a response from a remote receiver.

Trigger 1007, detection of a far-end a receiver termination, changes the repeater state to state 1008, RT.Fwd. In this state, the repeater enables high-speed transmission and reception for both the internal and external link, training the receiver's clock data recovery function (RxCDR) while transmitting the recovered data downstream to the next endpoint or intermediate in-line component. In some embodiments, the repeater only needs to achieve bit lock, which is a less challenging goal than performing symbol recovery.

While in this state, reception of a message embedded by modulation in the reference clock signal can put the repeater into any of several different states. For example, if the endpoints negotiate a change in data rate and produce trigger 1009, the repeater may go to the RT.Reconfig state 1010 to reconfigure itself for the new data rate, and return to RT.Fwd state 1008 when the configuration is complete, producing trigger 1011. Alternatively, the endpoint may transmit trigger 1015 to put the repeater into low power state 1014, and subsequently transmit trigger 1017 returning the repeater to RT.Fwd state 1008. Further, trigger 1019 is produced when the endpoints begin to negotiate a new data rate or other parameter, returning the repeater to Rx.Detect state 1006. Finally, the endpoint may issue trigger 1013 to put the repeater into a compliance-testing state 1012.

Alternative state machines may also be used if they achieve similar results. In some embodiments, the state machine is partially constrained by standards applicable to the link or network, such as PCIe or USB3.

FIGS. 11A-E are block diagrams of examples of multi-repeater links. Some transmission channels may be so long that data links, especially high speed data links, require more than one repeater in-line to produce a readable signal at each of the endpoints. In other systems, other types of intermediate components may be in-line such that a series of multiple components may benefit by receiving operating parameters embedded in a modulated clock signal.

FIG. 11A is a block diagram of an example of two endpoints communicating through two repeaters. However, the concepts in this diagram are readily extended to three or more repeaters, or to two or more other signal conditioning components that ideally reconfigure themselves dynamically in response to changes affecting system operation, or to a generalized combination. The communication link from a first endpoint 1102 to a second endpoint 1112 spans three segments; segment 1106 between endpoint 1102 and a first repeater 1108, segment 1116 between first repeater 1108 and second repeater 1118, and third segment 1126 between second repeater 1118 and second endpoint 1112. As illustrated, repeaters 1108 and 1118 and link segments 1106, 1116, and 1126 are bi-directional, but this approach can also be adapted for one-way transmission as described in the discussion of FIG. 6B.

Clock 1103, associated with a first endpoint 1102, generates an initial signal. Additional information is embedded in the clock signal, and modulated clock signal 1104 is transmitted to first repeater 1108. First repeater 1108 reads its relevant operating parameters (e.g., data-rate) by decoding modulated clock signal 1104 and uses control logic to reconfigure itself accordingly. Second repeater 1118 preferably receives the same information from the same clock signal. First repeater 1108 retransmits the first modulated clock signal 1104 as a second modulated clock signal 1114. Second repeater 1118 decodes incoming modulated clock signal 1114, reads its relevant operating parameters, and reconfigures itself accordingly. In some embodiments, links with multiple repeaters or other signal conditioners may tailor the embedded information format or the presence announcement and indexing mechanism used by the repeaters or other signal conditioners.

FIG. 11B is a simplified graph to demonstrate situations in which a modulated clock signal entering successive repeaters may be retransmitted as-is or, for long travel distances, may benefit from boosting and/or reconstruction. On the horizontal axis, L is travel distance in arbitrary units. On the vertical axis, a generalized quality metric Q may represent amplitude, symbol integrity, or any other trouble-distance-proportional effect on the signal. $Q_0$ represents the value of the quality metric at the endpoint originating the signal, and $Q_{min}$ represents the minimum value of the quality metric for a readable signal. For simplicity of understanding, the quality metric reduction is illustrated as linear with travel distance, and the effect of increasing data-rate is illustrated as an increase in slope of the line. However, loss of quality that is nonlinear with distance may behave analogously.

On the illustrated graph, the data signal D has a higher data-rate, and thus a steeper slope, than the clock signal C. The relationship of the two slopes in the illustration is qualitative and arbitrary for clarity; it does not represent any quantitative calculations or measurements for particular systems are particular data rates.

At L=0, data signal D and clock signal C exit the first endpoint with initial quality metric $Q_0$. At the first repeater $R_1$, data signal D has dropped to quality metric 1152, approaching the minimum readable quality. However, clock signal C still has a fairly high quality metric because its lower data rate makes it less sensitive to travel distance. Repeater $R_1$ therefore boosts and/or reconstructs data signal D to level 1154 but retransmits clock signal C as-is. At the second repeater $R_2$, data signal D has dropped again to level 1162, and additionally the unaltered clock signal C has continued dropping to level 1163. Both signals may now become unreadable if allowed to travel much further without alteration. In this example, repeater $R_2$ boosts and or reconstructs both data signal D and clock signal C to level 1164, after which the lines resume propagating at their characteristic slope. This demonstrates how a sufficiently long series of link segments may cause even the relatively distance-insensitive clock signal to benefit from conditioning.

FIGS. 11C-E are block diagrams of some embodiments of repeater's for use in multi-repeater links. A repeater may retransmit incoming clock signal 1104 with a simple splitter 1109 as in FIG. 11C, with a delay 1119 associated with buffering as in FIG. 11D, or with amplification 1129 as in FIG. 11E.

Figure 12A:
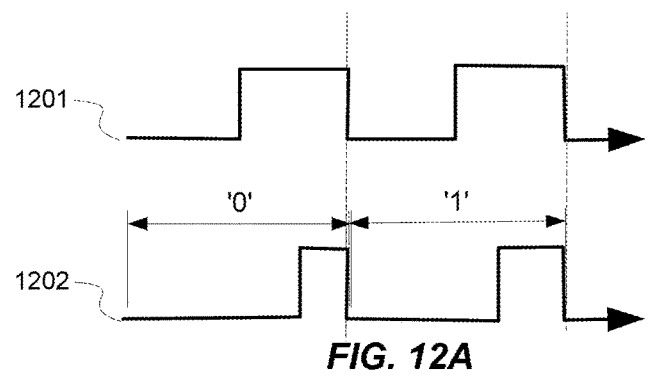
FIGS. 12A-B are pulse diagrams of alternative PWM approaches.
Figure 12B:
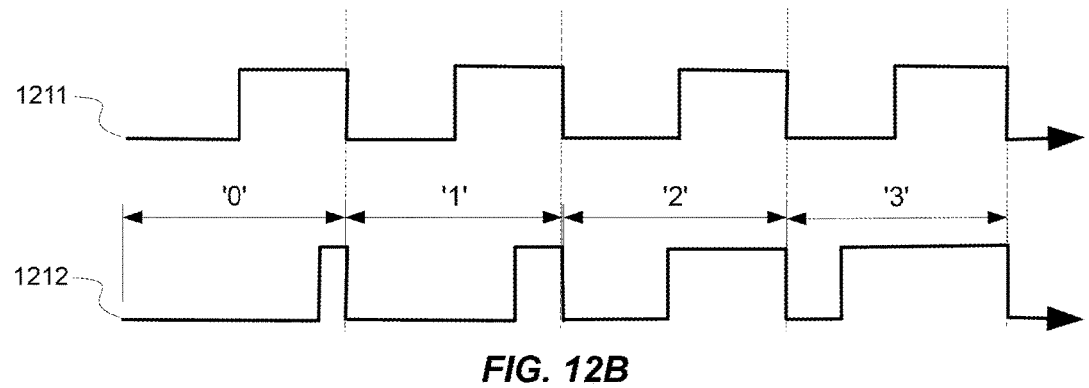

FIGS. 12A-B are pulse diagrams of alternative PWM approaches. FIG. 12A illustrates an example of inverted pulse width modulation (PWMI). While in previous examples the leading edge of the modulated pulse retains the timing information and the trailing edge carries the embedded information, in PWMI the trailing edge retains the timing information and the leading edge carries the embedded information. Pulse train 1201 is the original (unmodulated) clock signal, and pulse train 1202 has a logic "zero' embedded in the first pulse and a logic "one" embedded in the second pulse by PWMI. As illustrated, a logic "zero" begins later than a logic "one," both begin later than the original pulse, and both end with the same timing as the original pulse. Alternatively, both modulated pulses may be longer than the original pulse, the logic "one" pulse may begin later than the logic "zero" pulse, or the difference in pulse length between logic "one" and logic and "zero" may be any difference easily discernible to the receiving components.

FIG. 12B illustrates an example of PWMI encoding of non-binary information. As long as an identifiable feature of the pulse (here, the falling edge) maintains the original period of the clock, the duty cycle or pulse width may be either shorter or longer than that of the original clock signal. The same can be done with PWM. Using both longer and shorter duty cycles offers a wider range of distinguishable encoded values.

Figure 13:
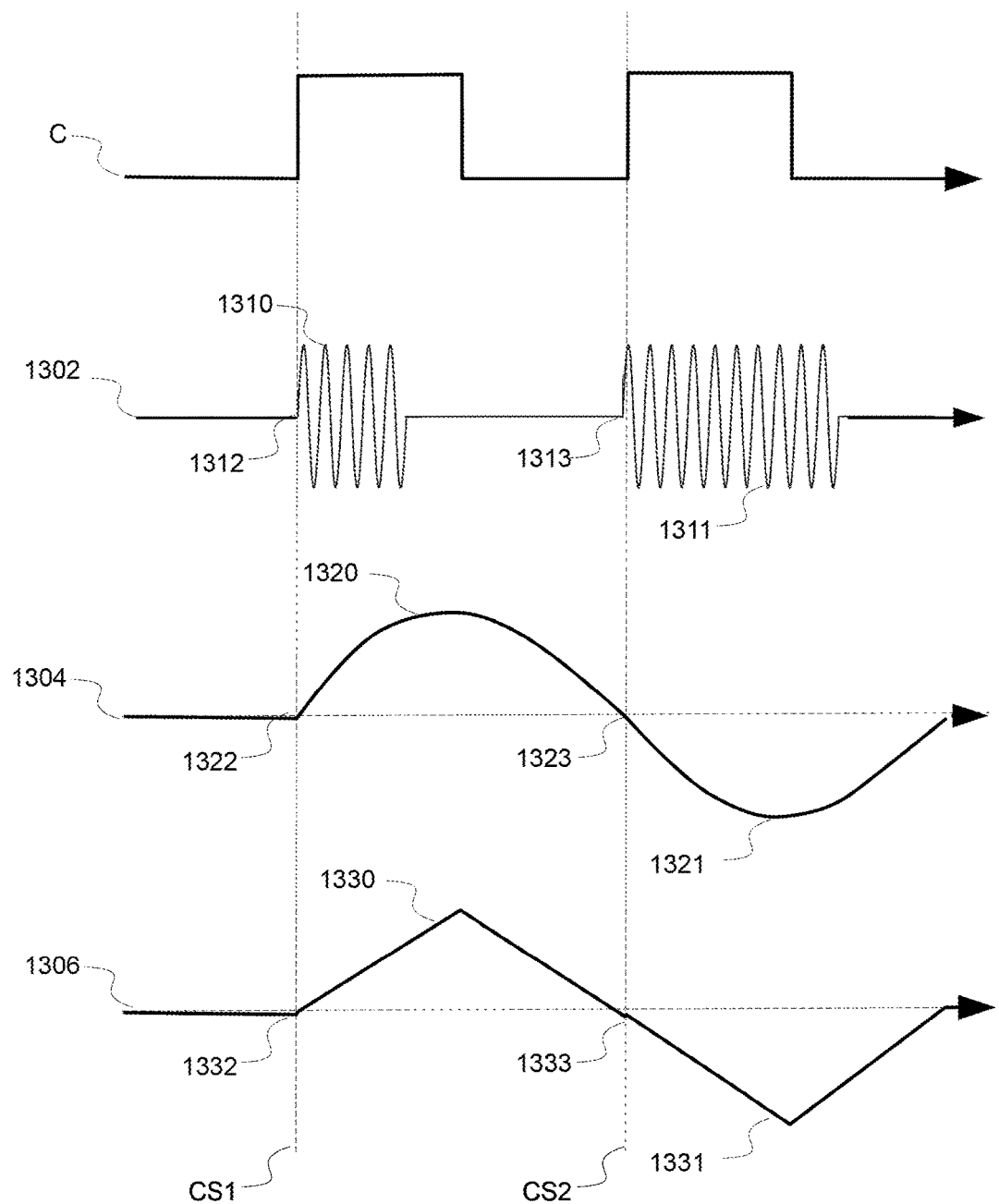
FIG. 13 illustrates examples of alternative types of modulation for embedding additional data in a clock signal.

FIG. 13 illustrates examples of alternative types of modulation for embedding additional data in a clock signal. The first curve, C, is an unmodulated clock signal for comparison. A number of other types of modulation can be substituted for PWM to encode operating parameters and other information in the clock signal. Curve 1302 is a clock signal with Low-frequency-periodic-signal-Based Pulse Modulation (LBPM or LFPS-based pulse modulation). The square-wave shapes of the clock pulses become bursts of more rapid oscillations. In, for example, Universal Serial Bus (USB) 3.1 standards documentation, which describes using LBPM for training and negotiation between endpoints, a shorter burst like 1310 is a logic "zero" and a longer burst like 1311 is a logic "one." The timing information is preserved in rising edges 1312 and 1313. Other correspondences for logic "zero" and logic "one," and inverted modulations where the falling edge preserves the timing information may also be incorporated herein.

Curve 1304 is an example of a clock signal with sinusoidal bi-phase modulation. In this example, the in-phase pulse 1320 represents a logic "zero" and out-of-phase pulse 1321 represents a logic "one." The timing information is preserved in zero points 1322 and 1323 between each pair of bits.

Bi-phase modulation can alternatively be done with non-sinusoidal waves. Curve 1306 illustrates an example of a triangle-based bi-phase modulation. In-phase pulse 1330 represents a logic "zero" and out-of-phase pulse 1331 represents a logic "one." As with the sine wave, the timing information from the clock is preserved by the zero-points 1332 and 1333.

Figure 14A:
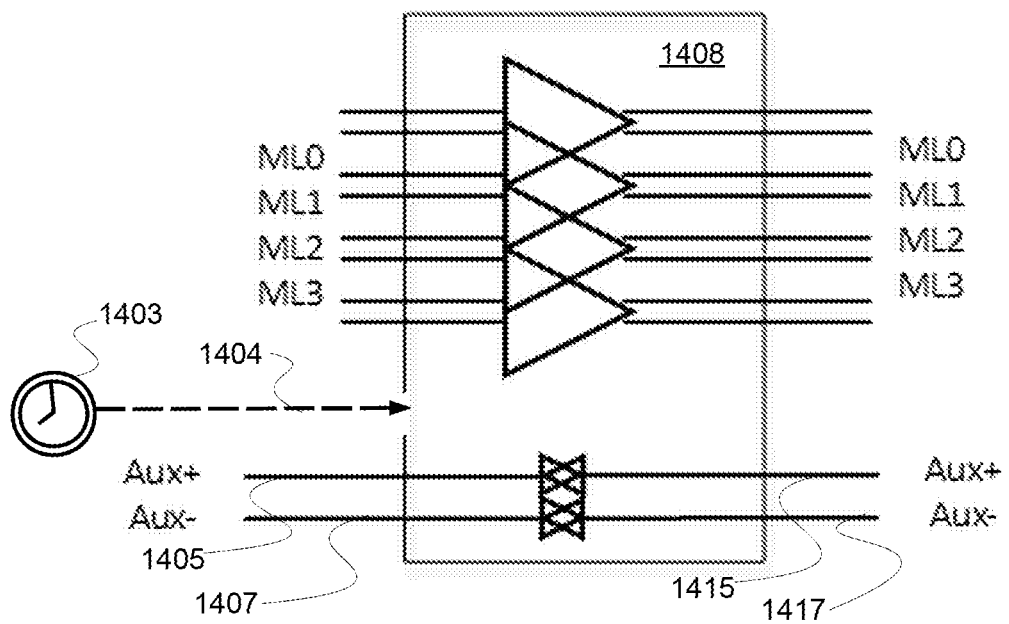
FIGS. 14A-B are schematics of examples of DisplayPort (DP) repeaters.
Figure 14B:
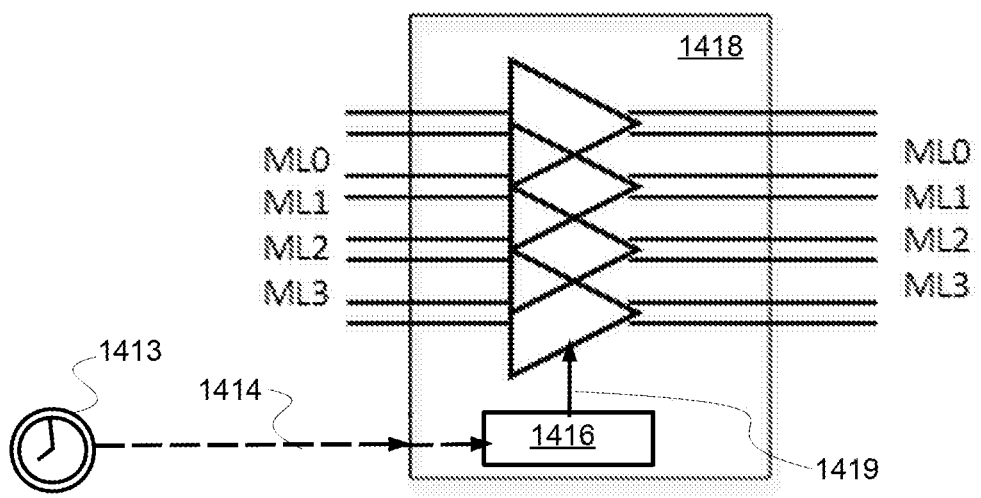

FIGS. 14A-B are schematics of examples of DisplayPort (DP) repeaters. FIG. 14A is a schematic of an example of a conventional DP repeater. Repeater 1408 acts on multiple lines ML0, ML1, ML2, and ML3. The repeater may receive a clock signal 1404 from a clock 1403, depending in part on the kind of repeater; stand-alone re-drivers do not necessarily make use of a clock signal. However, re-timers (and combination repeaters that include re-timers) do use a clock signal; for example, from an external crystal or a tap to a system reference clock. Even a repeater with a stand-alone re-driver may have access to a clock signal if the repeater is part of a compound component with an additional functionality that uses a clock signal.

Under a conventional approach, if the repeater is to actively participate in link training and other dynamic operations, those signals are sent and received through auxiliary lines 1405, 1407, 1415, and 1417. These auxiliary lines require additional input and output pins and additional logic in the repeater.

FIG. 14B is a schematic of the DP repeater that participates in link training and operation by receiving operating parameters such as data rate through modulation of a clock signal. Clock signal 1414 is forwarded from the DP transmitter's reference clock 1413 in a modulated state. At the DP transmitter, one or more operating parameters for the repeater are copied from an auxiliary channel and embedded in the clock signal by a modulator. The operating parameters include, for example, the selected data-rate for the next message through the link.

At the DP repeater, decoding and control logic 1416 extracts the operating parameter(s) from modulated clock signal 1414 and injects it into a control signal 1419 to control the operation of repeater 1418. Although the decoder and control logic may need to be added to repeater 1418, the only pin or connection besides the data lines is the clock signal, which may already have been part of the repeater.

Figure 15:
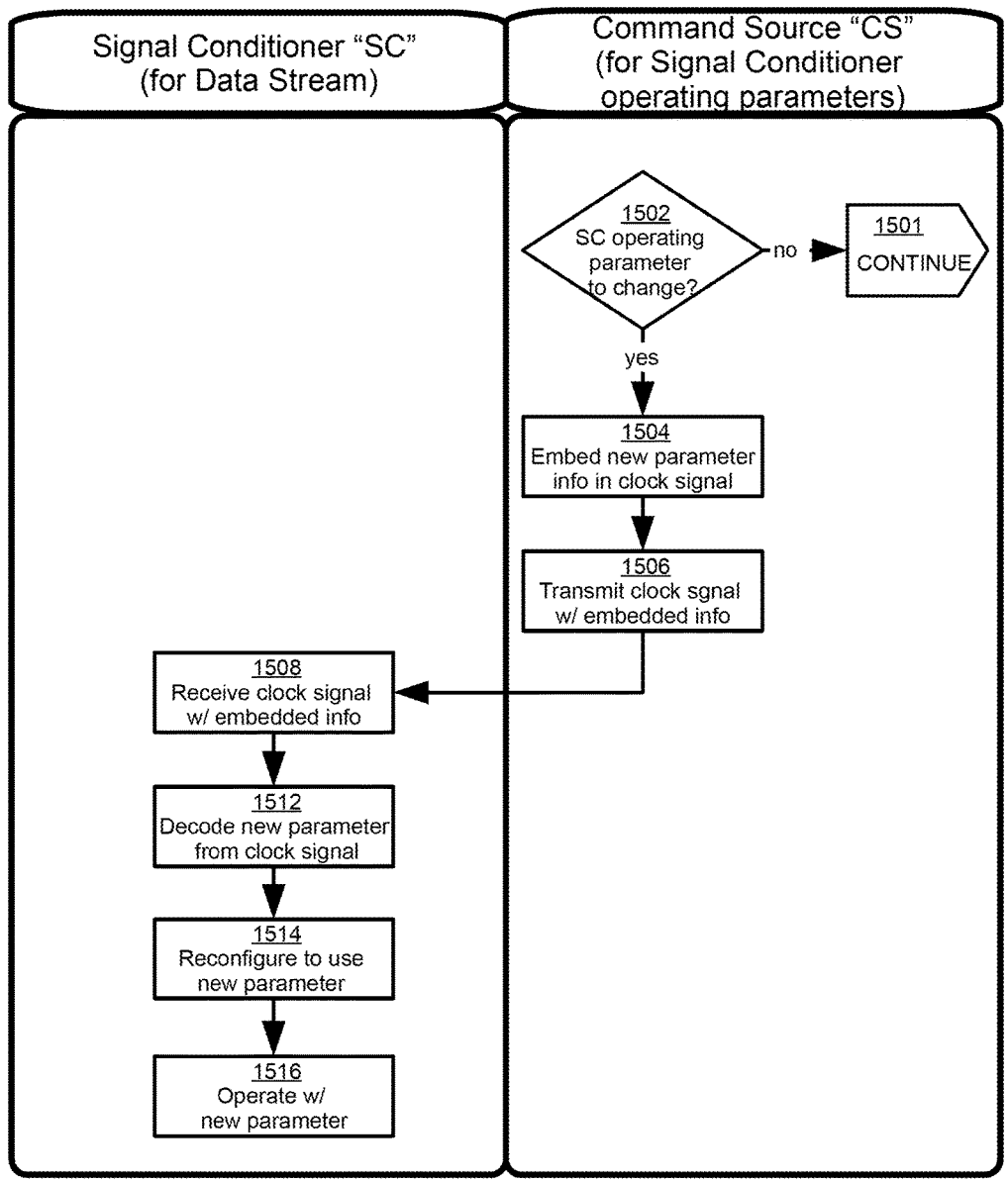
FIG. 15 is a swim-lane flowchart of an example of a modulated clock signal controlling a generalized signal conditioner that preferably changes an operating parameter dynamically in response to changes elsewhere in the system.

FIG. 15 is a swim-lane flowchart of an example of a modulated clock signal controlling a generalized signal conditioner that preferably changes an operating parameter dynamically in response to changes elsewhere in the system.

At decision 1502, the controlling endpoint (or other command source) senses whether a variable operating parameter in the signal conditioner will need to change. The sentencing may result from continuous or periodic monitoring of system states that potentially affect the operating parameter. If the operating parameter does not need to change, the command source continues the monitoring as well as other tasks in step 1501, optionally without disturbing the signal conditioner. If the operating parameter does need to change, the command source modulates the clock signal at step 1504, embedding the new value of the parameter while retaining the timing information. The clock signal may be generated at the command source or forwarded through the command source from elsewhere in the system. Any suitable type of modulation may be used. At step 1506, the command source transmits the modulated clock signal to the signal conditioner.

The signal conditioner receives the modulated clock signal at step 1508 and decodes the modulated clock signal to extract the new operating parameter at step 1512. The signal conditioner reconfigures itself to use the new operating parameter, for example using internal control logic, at step 1514 and continues operating within the parameter at 1516.

Other signal conditioners in addition to repeaters may need to dynamically change one or more operating parameters to respond to ongoing changes in the input signal. For example, an amplifier using automatic gain control may become more responsive if it has access to information on what amplitude to expect. Similarly, a variable filter may change its profile to deliver a constant output spectrum from a changing input spectrum. Like repeaters, they may benefit from receiving new operating parameters on a relatively low-data-rate clock channel rather than a much higher-rate, more crowded, and protocol-specific data-stream.

Figure 16:
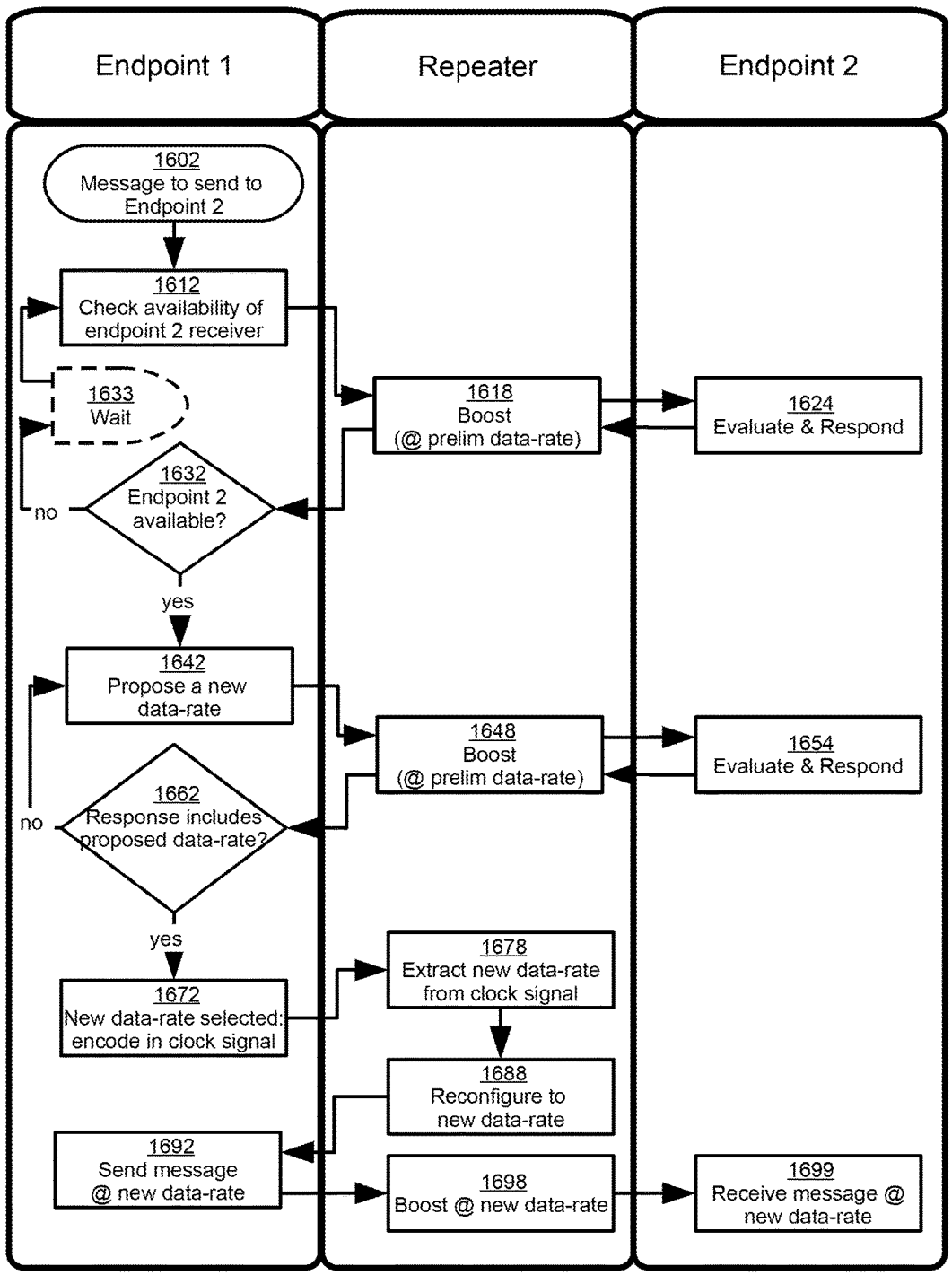
FIG. 16 is a swim-lane flowchart of an example of a modulated clock signal controlling a repeater to accommodate changing data-rates on a variable-rate link.

FIG. 16 is a swim-lane flowchart of an example of a modulated clock signal controlling a repeater to accommodate changing data-rates on a variable-rate link. This flowchart is supplied to fill in more detail about a particular scenario that is also broadly covered by the generalized flowchart of FIG. 15.

The process begins at step 1602 when endpoint 1 (e.g., a controller module) generates a message (e.g., one or more control commands) to be sent to endpoint 2 (e.g., a peripheral module such as an I/O device). At step 1612, endpoint 1 transmits a request to endpoint 2 to discover whether the receiver is free to receive the message. The repeater is already operating at a previously selected data-rate. The request is part of the data-stream that goes through the repeater and, as such, is boosted (or reconstructed) on its way to endpoint 2 in step 1616. In step 1624, endpoint 2 evaluates its situation and transmits a response signifying that it is either free or busy. The response travels back through the repeater on its way to endpoint one and is boosted or reconstructed as it was in step 1616.

Upon receiving the response, endpoint 1 determines at decision 1632 whether to proceed with sending the message (if endpoint 2 is free) or wait for a better time (if endpoint 2 is busy). For clarity, the illustrated workflow offers only two choices, although in practice decision 1632 may have additional branches, such as whether the message is urgent enough for an override the signal currently being received at endpoint 2. If the response reveals that endpoint 2 is busy, endpoint 1, after an optional predetermined delay 1633, returns to step 1612 to transmit another request, repeating the process until it receives a response indicating that endpoint 2 is free.

If, at decision 1632, the response indicates that endpoint 2 is free, endpoint 1 transmits a proposed data rate at step 1642. For example, endpoint 1 may initially propose the fastest data-rate supported by the system. As with the request, the repeater boosts or reconstructs the signal at its previously determined data rate in step 1648. At step 1654, endpoint 2 measures its expected capacity and responds with either a counter-proposed slower data rate (if its capacity is insufficient) or with the proposed data rate from endpoint 1 (if its capacity is sufficient). This transmission also is part of the data-stream that is boosted or reconstructed by the repeater on its way to endpoint 1. When endpoint 1 receives the response, if the response includes a data rate different from the proposed data rate, endpoint 1 may continue the negotiation process by proposing another data rate, which may or may not be the counter-proposed data rate.

If, at decision 1662, the response includes the same data-rate as the previous proposal, endpoint 1 modulates its clock signal to embed the newly selected data rate, along with any appropriate supporting information such as a header or a parity bit, at step 1672. At step 1678, the repeater receives the modulated clock signal on its clock channel (which may be separate from the data channel) and decodes the signal to extract the new data rate. At step 1688, the repeater uses control logic to reconfigure itself for the new data rate. At step 1692, endpoint 1 ascertains that the repeater is reconfigured and sends the message at the new data rate. At step 1698, the repeater receives the message in the data stream and boosts or reconstructs it at the new data rate. Finally, at step 1699, endpoint 2 receives the message at the new data rate.

Some embodiments may add, subtract, rearrange, alter the process steps; for example, to comply with a standard or to take advantage of particular features of the architecture. These equivalents to achieve the same goal of reconfiguring a repeater to accommodate two or more different data rates are still within the scope of the subject matter.

The Following Examples Pertain to Further Embodiments

Example 1 a signal conditioner. The signal conditioner includes a data stream from a data-stream channel. In Example 1, the signal conditioner may include a conditioning circuit to modify the data stream according to a variable operating parameter, a data transmitter to transmit the data-stream after the modifying, and a clock receiver to receive a clock signal from a clock channel. In some embodiments, the clock channel is separate from the data-stream channel and the clock signal has a lower data rate than the data steam. Furthermore, the signal conditioner may include a decoder to extract the operating parameter embedded in the clock signal by modulation and control logic to reconfigure the conditioning circuit in response to a change in the operating parameter extracted by the decoder.

In Example 2, the conditioning circuit may include a re-driver, a re-timer, or a combination of both. In Example 3, the conditioning circuit may include a re-driver to restore a degraded analog signals and a re-timer to recover a degraded analog signal with a digital data recovery circuit and re-transmit the signal with a locally generated transmit clock. In Example 4, the conditioning circuit may include an automatic gain control or a configurable equalizer.

In Example 5, the data-stream may include commands from a controller to operate a remote peripheral device. In Example 6, the remote peripheral device includes hardware for input and output of data to and from the controller. In Example 7, the data-stream may be transmitted at a rate greater than 1 Gbps, and the clock signal may be transmitted at a rate less than 1 Gbps. In Example 8, the data-stream is transmitted at least ten times faster than the clock signal. In Example 9, the operating parameter includes a data-rate. In Example 10, the modulation includes one of pulse-width modulation, low-frequency-periodic-signal-based pulse modulation, or bi-phase modulation.

Example 11 includes an endpoint device. An endpoint device may include a data-stream transmitter to transmit a data stream and a data-stream receiver to receive a data stream. The endpoint device may further include a source of a clock signal and an encoder to embed additional information in the clock signal while preserving the timing information. The endpoint device further includes a clock signal transmitter to transit the clock signal with encoding, a data channel to carry the data-stream to an in-line component, and a channel to carry the clock signal with encoding to the in-line component. In some embodiments, the in-line component is to react to the embedded additional information.

In Example 12, the in-line component is to change an operating parameter at least once during operation and the additional information includes a change in the operating parameter. In Example 13, the change in the operating parameter may be derived from information in the data-stream reaching the receiver. In Example 14, the change in the operating parameter results from a negotiation between the endpoint and another endpoint coupled to the in-line component. In Example 15, the operating parameter may include a data-rate to be transmitted and received. In Example 16, the encoder may modulate the clock signal to embed the additional information.

In Example 17, the encoder may embed the additional information by pulse-width modulation, low-frequency-periodic-signal-based pulse modulation, or bi-phase modulation. In Example 18, data-stream transmitter and the data-stream receiver may operate at a data rate greater than one Gbps and the clock signal transmitter may operate at a data-rate less than one Gbps. In Example 19, the data-stream is transmitted and received at a data-rate at least ten times greater than a data rate of the clock signal. In Example 20, the source of the clock signal is integrated in the endpoint. In Example 21, the source of the clock signal is transmitted into the endpoint from an external location.

In Example 22, a system which may include a first endpoint, a second endpoint, a first in-line component, a first link segment, a second link segment, and a first clock channel. The first endpoint may include a first transmitter, a first receiver, a data copier coupled to the first receiver, a clock-signal source, and a modulation encoder coupled to the data copier and to the clock-signal source.

The second endpoint may include a second transmitter and a second receiver. The first in-line component may include a modulation decoder and control logic to modify operation of the in-line component in response to a message. Further, a first link segment may carry the data-stream between the first endpoint and the in-line component and the second link component may carry the data-stream between the in-line component and the second endpoint.

The first clock channel may be separated from the first link segment and the second link segment to carry an encoded clock signal from the modulation encoder to the modulation decoder. In some embodiments, in response to the first endpoint's identification of a message in the data stream to control the in-line component. The data copier may copy the message to the modulation encoder. Further, the modulation encoder may embed the message in the clock signal while preserving timing information in the clock signal, thereby forming the encoded clock signal.

In some embodiments, the encoded clock signal is transmitted to the in-line component through the first clock channel and decoded by the decoder to yield the message. Furthermore, the in-line component may modify its operation in response to the message.

In Example 23, the in-line component includes a signal conditioner to receive, condition, and re-transmit the data-stream and the message includes information to control the signal conditioner. In Example 24, the signal conditioner comprises a re-deriver, a re-timer, or both. In Example 25, the data-stream flows between the first endpoint and the second endpoint through the in-line component in both directions simultaneously and the signal conditioner may condition the signal traveling in both directions.

In Example 26, the data-stream may flow to the first link segment in the second link segment at any of a plurality of data rates. In some embodiments, the in-line component may operate differently for different data rates and the message may be to reconfigure the in-line component to operate at a different data rate. In Example 27, the message may have a different protocol from a data-stream protocol. In Example 28, decoding the message by the in-line component requires no knowledge of the data-stream protocol. In Example 29, the data-stream protocol includes Peripheral Component Interconnect Express, Display-Port, or Universal Serial Bus. In Example 30, the message is generated in response to a negotiation or training between the first endpoint and the second endpoint, or between the first endpoint and the in-line component.

In Example 31, the first link segment includes an internal link and the second link segment includes an external link. In Example 32, the system may include a second in-line component coupled to the first in-line component and the first endpoint or the second endpoint and a second clock channel coupled to a decoder of the second in-line component. The second clock channel may carry messages for the second in-line component which decodes the messages and modifies its operation in response to the messages. In Example 33, the encoded clock-signal is re-transmit through the second clock channel by the first in-line component.

In Example 34, a non-transitory computer readable medium storing computer readable instructions. When executed, the computer readable medium causes a machine to monitor the content of a data-stream flowing through a link, copy a control message for an in-line component from the data-stream to an encoder, encode the control message in a clock signal while preserving the timing information, transmit the clock signal with the encoded control message to the in-line component over a clock channel separate from the link carrying the data-stream, decode the encoded control message at the in-line component, and reconfigure the in-line component in response to the control message.

In Examples 35 and 36, the control message may include an ordered training set and the ordered training set includes a header, a type, a full word or a half-word, and a parity. In Example 37, the control message may include a change in the data-rate of the data-stream. In Example 38, the control message may include a compliance test.

Example 39 includes a method that includes monitoring the content of a data-stream flowing through a link. The method further includes copying a control message for an in-line component from the data-stream to an encoder; encoding the control message in a clock signal while preserving the timing information; and transmitting the clock signal with the encoded control message to the in-line component over a clock channel separate from the link carrying the data stream. Furthermore, the method includes decoding the encoded control message at the in-line component and reconfiguring the in-line component in response to the control message.

In Example 40, the control message includes an ordered training set. In Example 41, the ordered training set may include a header, a type, a full word or a half-word, and a parity. In Example 42, the control message may include a change in the data-rate of the data-stream. In Example 43, the control message may include a compliance test.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, numerous foregoing uses of "embodiment," "example," or similar terms may refer either to a single embodiment or to different and distinct embodiments.

The preceding Description and accompanying Drawings describe examples of embodiments in some detail to aid understanding. However, the scope of protection may also include equivalents, permutations, and combinations that are not explicitly described herein. Only the claims appended here (along with those of parent, child, or divisional patents, if any) define the limits of the protected intellectual-property rights.

What is claimed is:

1. An endpoint, comprising:
   a data-stream transmitter to transmit a data stream;
   a data-stream receiver to receive a data stream;
   a source of a clock signal;
   an encoder to embed additional information in the clock signal while preserving timing information;
   a clock signal transmitter to transmit the clock signal with encoding;
   a data channel to carry the data stream to an in-line component; and
   a channel to carry the clock signal with encoding to the in-line component;
   wherein the in-line component is to react to the embedded additional information.

2. The endpoint of claim 1, wherein the in-line component is to change an operating parameter at least once during operation; and wherein the additional information comprises a change in the operating parameter.

3. The endpoint of claim 2, wherein the change in the operating parameter is derived from information in the data stream reaching the receiver.

4. The endpoint of claim 2, wherein the change in the operating parameter results from a negotiation between the endpoint and another endpoint coupled to the in-line component.

5. The endpoint of claim 2, wherein the operating parameter comprises a data rate to be transmitted and received.

6. The endpoint of claim 1, wherein the encoder modulates the clock signal to embed the additional information.

7. The endpoint, of claim 1, wherein the encoder embeds the additional information by pulse--width modulation, low-frequency-periodic-signal-based pulse modulation, or bi-phase modulation.

8. The endpoint of claim 1, wherein the data-stream transmitter and the data-stream receiver operate at a data rate greater than one Gbps; and wherein the clock signal transmitter operates at a data rate less than one Gbps.

* * * * *

UNITED STATES PATENT AND TRADEMARK OFFICE
CERTIFICATE OF CORRECTION

PATENT NO.        : 10,223,324 B2
APPLICATION NO.   : 15/607362
DATED             : March 5, 2019
INVENTOR(S)       : Huimin Chen et al.

Page 1 of 1

It is certified that error appears in the above-identified patent and that said Letters Patent is hereby corrected as shown below:

In the Claims

Column 25
Line 14, "The endpoint, of" should read -- The endpoint of --
Line 15, "...pulse--width" should read -- ...pulse-width --

Signed and Sealed this
Twenty-fifth Day of June, 2019

Andrei Iancu
*Director of the United States Patent and Trademark Office*